United States Patent [19]
Tiazkun et al.

[11] 3,749,866
[45] July 31, 1973

[54] FOAM SEAT SENSOR
[75] Inventors: Michael George Tiazkun, Lykens; Winfield Warren Loose, Linglestown, both of Pa.
[73] Assignee: AMP Incorporated, Harrisburg, Pa.
[22] Filed: May 1, 1972
[21] Appl. No.: 249,114

[52] U.S. Cl................. 200/85 A, 340/272, 180/102
[51] Int. Cl. ........................................... H01h 3/02
[58] Field of Search.................. 200/85 R, 85 A, 86; 307/10 SB; 180/102; 340/52 E, 272

[56] References Cited
UNITED STATES PATENTS
3,541,343  11/1970  Butler................................... 307/10

Primary Examiner—Herman J. Hohauser
Attorney—William J. Keating, Frederick W. Raring et al.

[57] ABSTRACT

A planar, low profile switch assembly at each occupant position of a foam vehicle seat construction comprises upper and lower spaced, flexible conductive metal strips with a foam strip interposed between and separating the metal strips. Primary lances partially struck from the upper strip normally lie in the same plane as the upper strip proper but are flexed by seat occupation, the primary lances deflecting through openings in the foam strip to make contact with the lower metal strip. A plurality of longitudinally spaced secondary lances are carried at the free end of the primary lance for contact wiping and arc prevention, respectively.

7 Claims, 13 Drawing Figures

PATENTED JUL 31 1973 3,749,866

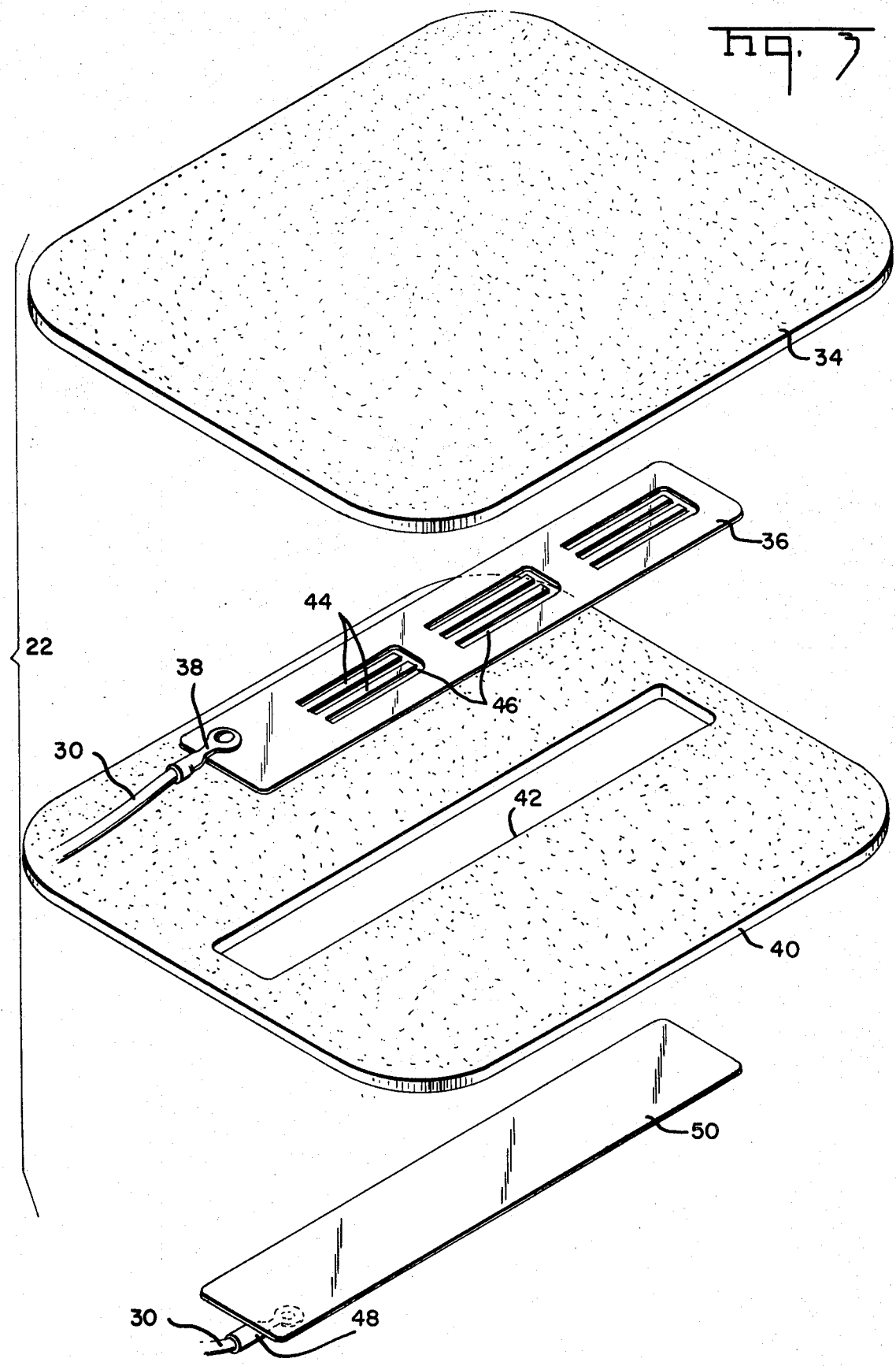

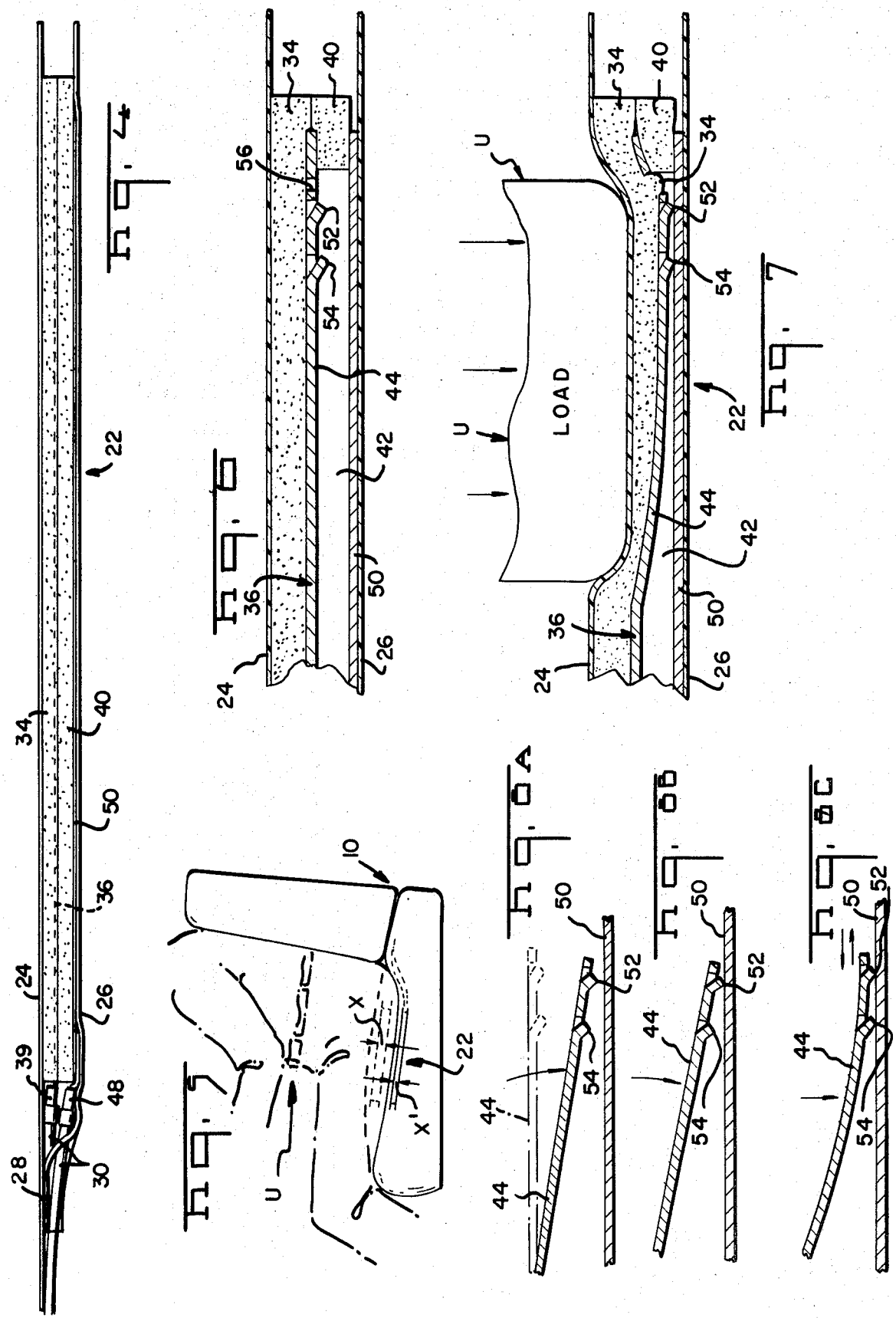

FOAM SEAT SENSOR

BACKGROUND OF THE INVENTION

1. Field of the Invention

This invention relates to vehicle seat occupant sensing switches, and more particularly to a planar, low profile switch assembly, particularly useful in conjunction with foam seat constructions.

2. Description of the Prior Art

In the development of automotive vehicles, seat constructions employing multiple coil springs for resiliency have long been employed. In an effort to provide more comfortable seating, in recent years seat constructions have incorporated as the upper layer, foam pads and have practically replaced the coil spring type of vehicle seats.

In automotive safety systems, electrical switches responsive to the sensing of the occupancy of the seat, have been employed, in conjunction with other switches responsive to proper coupling of seat belts, to either inform the driver and the other occupants of the vehicle that proper safety procedures have been followed or, in some case, have been employed to actually prevent vehicle operation in the absence of completion of buckling of the seat belts. In an effort to insure that only those seat belts for each occupant position actually used have been coupled, switches have been incorporated in the seat constructions at each possible occupant location or position to sense the occupant, with the switches being appropriately connected electrically within the electrical safety system. One attempt at providing a localized indication of occupancy involves a planar switch assembly achieved by placing a perforated, open foam pad between two sheets or strips of conductive metal such as copper which, in turn, have facing dimples or protrusions aligned with the perforations or holes in the foam such that during occupancy the foam collapses, and the dimples make contact. While such seat sensor switches act to some degree of satisfaction, there are inherent difficulties and problems with respect to such structures. Since point contact is made between the dimples, there is no scrubbing or cleaning action, that is, there is no relative movement between the surfaces in contact. Without a wiping action, arcing occurs which builds up oxidation around the area of contact which then leads to resistance at that point, between the switch contact areas. Further, the resiliency of the foam pad is required to return the metal sheets to non-contact position and, depending upon the extent of occupancy or the weight of the occupant, a compressive set may occur, which may be to such a degree as to indicate continued occupancy although the occupant has left the vehicle. Further, seat constructions of this type have involved sensors positioned on the two outside positions and a center position, as in the rear seat of a conventional passenger sedan, for instance. Occupants of the two outside seat locations create during the depression of the foam portion of the seat, tension across the surface of the upper sheet which tends to pull it into contact with the lower conductive sheet at the center of the seat so as to close even though no occupant is sitting in the center position. In such a case, in the absence of the occupant, the failure to further connect the seat belt corresponding to the center occupancy position of that particular seat renders a false indication and may prevent operation of the vehicle although all occupants in the vehicle have properly coupled their seat belts.

SUMMARY OF THE INVENTION

The present invention is directed to an improved planar, low profile switch assembly operable by distortion due to a human body positioned upon the same, the assembly comprising an upper flexible, conductive metal strip, spaced from a similar lower flexible conductive metal strip, by a foam member interposed between the strips and tending to maintain the strips in spaced, non-contact position in the absence of the human body. At least one lance is partially struck from the upper strip and normally lies in the same plane as the upper strip proper, but is displaceable towards the other strip during forcible depressed distortion of the assembly. The foam member includes a recess surrounding the primary lance which permits deflection of the lance within the foam member opening and into contact with the lower metal strip.

Preferably, the primary lance includes two secondary lances which are longitudinally spaced from each other and adjacent the free end of the primary lance, the primary and secondary lances being partially struck from the upper strip and from the primary lance respectively in a direction such that the outboard secondary lance effects a wiping action in the area of contact with the lower strip by a slight extension and retraction of the primary lance while the inboard secondary lance maintains contact with the lower metal strip upon possible bouncing of the first secondary lance to prevent arcing between the metal strips at the contact interface.

In one embodiment, a solid second foam strip overlies the upper metal strip, whereby compression of the switch assembly by body contact causes a localized portion of the second foam strip corresponding to the opening in the upper strip defined by the primary lance to depress the primary lance into contact with the lower metal strip, but upon release thereof, the bias of the primary lance forces the localized deformed portion of the second foam member to return through the opening and returns the primary lance to coplanar position with respect to the upper metal strip proper. Preferably, each planar low profile switch assembly is carried within recesses within a foam pad spanning a vehicle seat construction with the number of recesses corresponding to the possible seat occupancy positions.

BRIEF DESCRIPTION OF THE DRAWINGS

FIG. 3 is an exploded, perspective view of the seat switch of FIG. 2.

FIG. 4 is a sectional view of the seat switch illustrated in FIGS. 2 and 3.

FIG. 5 is a diagrammatic side view of the seat illustrated in FIG. 1, during occupancy, with the dotted line position showing the unoccupied condition.

FIG. 6 is an enlarged, sectional view of a portion of the seat switch assembly illustrated in FIG. 4 and in switch open, non-seat occupied condition.

FIG. 7 is an enlarged sectional view of the portion of the switch illustrated in FIG. 6, during occupancy.

FIGS. 8a, 8b and 8c are sequential diagrammatic views of a portion of the seat switch of FIGS. 2–6 inclusive, illustrating the wiping action during seat occupancy.

DESCRIPTION OF THE PREFERRED EMBODIMENTS

Figure 1:
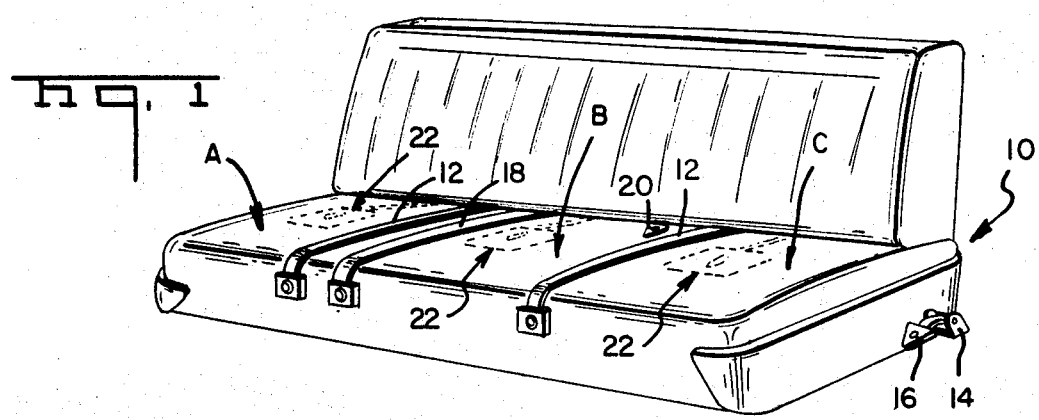
FIG. 1 is a perspective view of an automotive vehicle seat incorporating a plurality of foam seat sensor switches of the present invention, in one form, at each possible seat occupancy position.

The switch assemblies in the multiple embodiment forms as shown, have application to conventional automotive vehicles, particularly in conjunction with seats incorporating a foam pad as a resilient support member with or without conventional coil springs. Reference to FIG. 1 illustrates a vehicle seat construction 10 which may, for instance, comprise the rear seat of an automobile sedan in which case there is provided three passenger occupant positions, two at each side as indicated generally at A and C and a center occupancy position indicated generally at B. In that respect, the seat is equipped with a plurality of seat belts including belt sections 12 for the outside occupants which couple to extendable belt sections 14 carried by reel 16 on each side of the seat, the center occupant at position B making use of belt section 18 which couples to a second section 20. Coupling completes an electrical circuit (not shown) indicative of proper fastening of the seat belts for each passenger section. The seat 10 itself is rectangular in form and the upper half of which comprises a foam pad which is recessed to receive individual, planar low profile seat sensor switches or assemblies 22 at each occupant position, A, B and C. It is preferred that each seat sensor switch 22 cooperate with respective seat belt sections to indicate both the occupancy of the seat portion by an occupant, and the mechanical coupling of the belt halves or sections prior to permitting engine ignition or indicating by an appropriate light or buzzer the compliance with the safety requirements, consisting in this case of coupling of the belt sections about the occupant.

Figure 2:
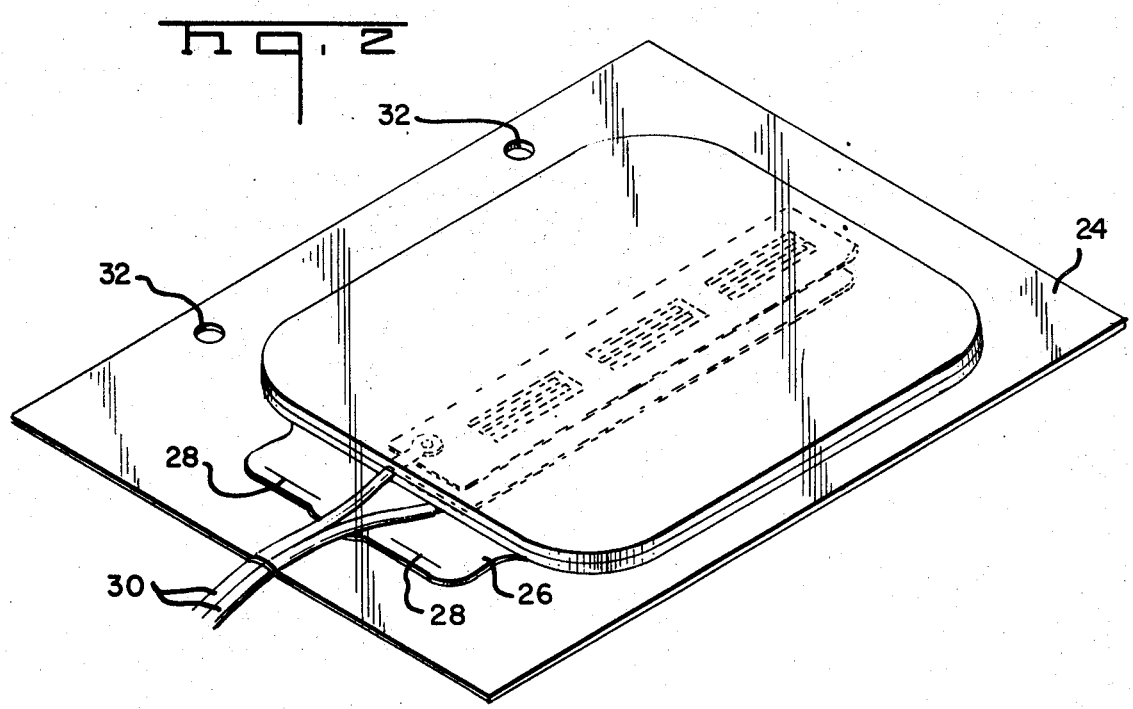
FIG. 2 is a perspective view of one embodiment of a foam seat sensor switch employed in the vehicle seat construction of FIG. 1.

Each of the seat sensor switches 22 in the embodiment employed in FIG. 1, is illustrated further in perspective in FIG. 2 and in an exploded perspective view in FIG. 3. Upper and lower mylar film 24 and 26 are ultrasonically welded together at weld points 28 to insure proper placement of electrical leads 30, the mylar film sheets 24 and 26 being generally rectangular in form and carrying aligned apertures 32 permitting the switch assemblies to be maintained in proper position within recesses (not shown) within the foam pad overlying the top of seat 10. In FIG. 3, the mylar top and bottom sheets 24 and 26 are omitted for clarity, the upper mylar sheet 24 overlying a solid foam sheet or strip 34 which is approximately one-eighth of an inch in thickness and formed of conventional open foam, plastic material which is an electrical insulator. In fact, the foam strip 34 may be of the identical material to that which forms the foam pad of the seat 10. The foam strip 34 overlies an active metal conductor strip 36 which is attached to one of the electrical leads 30 by a suitable connector 38, strip 36 constituting in this case an active conductor of the switch assembly. Lying beneath the active conductor strip 36 and separating the active conductor strip 36 from the solid passive metal conductor strip 38, is a second open foam, plastic sheet or strip 40 of generally the same rectangular configuration to sheet 34, but in this case being provided with a rectangular opening 42 running longitudinally through the center of the same, generally in line with the active conductor 36. The active conductor strip 36 is slightly wider than the opening 42 of foam strip 40. A series of integral, flexible primary lances 44 are struck partially from the active conductor strip 36. In the embodiment of FIG. 3, E-shaped openings 46 are formed within the active conductor strip to define the paired lances 44 at three longitudinally spaced locations. Active conductor 36, the opening 42 and underlying passive conductor 50 extend generally in longitudinal alignment with the body of the occupant, the switch assembly 22 being less than the width of an average occupant. Thus, the number of primary lances 44 which are carried by the active conductor are esssentially the number sufficient to insure that at least one of the lances makes electrical contact with the underlying passive conductor which normally is spaced from the same by the thickness of the interspersed foam pad 40. Terminal 48 connects the passive conductor strip 50 to the other electrical lead 30 such that the flexure of any one of the primary lances downwardly through opening 42 and into contact with the upper surface of the passive conductor completes an electrical circuit between the leads 30 and is indicative of occupancy of the vehicle seat position or location. While the mylar sheets or films 24 and 26 are not shown in the exploded view of FIG. 3, the passive conductor may be bonded to the bottom mylar strip 26 to facilitate proper positioning or assembly of the switch components. The function of the mylar film or strip 26 is to electrically isolate the passive conductor 38 with the exception of the primary lances 44 carried by the active conductor which make contact with the passive conductor through opening 42 of the interspersed foam strip 40.

Reference to FIGS. 4–8 show in detail, the construction of each switch assembly 22 and its mode of operation.

As more clearly seen in FIGS. 6, 7, 8a, 8b and 8c, each of the primary lances 44 is provided with first and second, secondary lances 52 and 54, these short lances being relatively rigid and struck from the center of the primary lance. Secondary lance 52 lies adjacent the end 56 of the primary lance, while secondary lance 54 is spaced slightly inboard of the same. The secondary lances 52 and 54 depend downwardly, that is, they are actually bent with respect to the plane of the active conductor, while in the unflexed position, the primary lances 44 are in line therewith. The secondary lances 52 and 54 are inclined in the same direction as the primary lances 44, towards end 56 of the primary lance.

Each secondary lance 52 and 54 for eah primary lance 44 performs a particular function during switching and, effectively, each secondary lance forms a lance within a lance on the active conductor. When pressure is applied to the upper, solid foam strip 34, at locations defined by the E-shaped openings 46 within the active conductor 36, localized portions of the solid foam strip 34 protrude through the openings forcing the primary lances 44 downward, the primary lances 44 being essentially cantilever mounted such that ordinarily the outboard secondary lance 52 makes initial contact with the passive conductor strip 38. The contact between the outboard secondary lance 52 and the passive conductor strip 38 may occur initially with a bounce and, when the primary lance 44 continues to be depressed by the localized portions of the foam strip 34, the lance 44 shifts axially in a forward direction as evidenced in FIGS. 8a, 8b and 8c in the sequence shown, whereby the edge contact of the inclined secondary lance 52 wipes first, in a forward direction across the upper surface of the passive conductor strip 38 and then in a reverse direction, that is, the primary lance overrides during the bounce, the inboard secondary lance 54 then may make contact with the same passive conductor strip 38, in the event of extra pressure, thus relieving the pressure on the outboard secondary lance 52. Since the inboard secondary lance 54 is in contact with the passive conductor strip 38, there will be no arcing between the outboard secondary lance 52 and the passive conductor strip 38, due to the creation of a momentary gap between these elements. Further, if only a single secondary lance is employed to contact the lower electrode or passive conductor strip 38 initially each time the switch completes the circuit, it may deteriorate because of arcing over a period of time. Normally, there is no danger, since during continued occupancy, the switch is relatively static. The purpose of the parallel switches formed by each of the primary lances 44 is to insure that contact will be completed between the active conductor strip 36 and the passive conductor strip 28 at at least one primary lance location. Reference to FIG. 5 illustrates the fact that where a relatively thick foam pad constitutes the major portion of the seat, depression by an occupant U is essentially at right angles to the plane of the seat and the switch assembly 22 merely shifts from the dotted line position shown to a full line position and is retained generally in a planar shape rather than shifting to an arcuate or curved configuration. Further, reference to FIG. 7 indicates how localized portions of the upper foam strip 34 move into the E-shaped openings 46 and actually protrude well below the plane of the upper surface of the lower foam strip 40.

Figure 9:
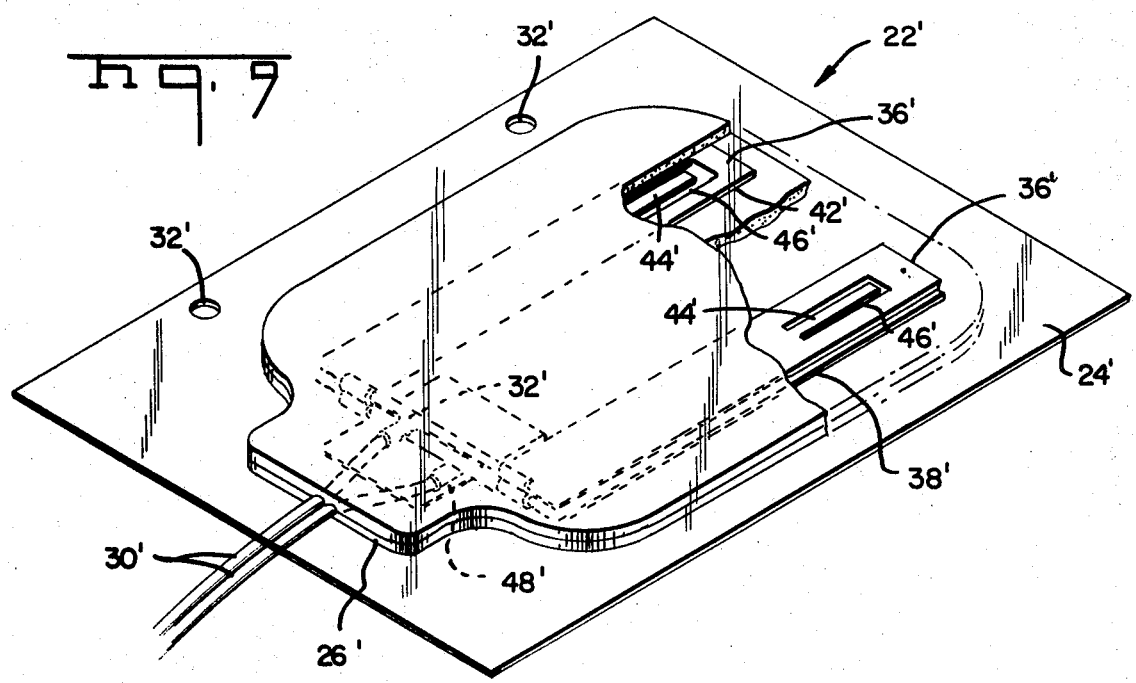
FIG. 9 is a perspective view, partially broken away of a second embodiment of the seat sensor switch of the present invention.
Figure 10:
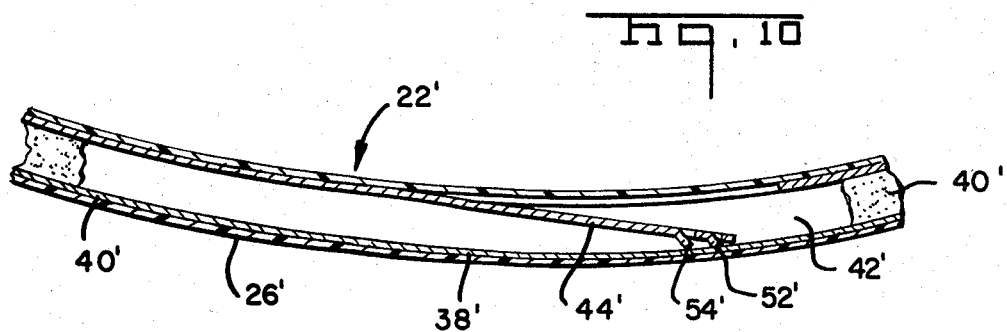
FIG. 10 is a sectional view of a portion of the seat switch of FIG. 9 during seat occupancy.
Figure 11:
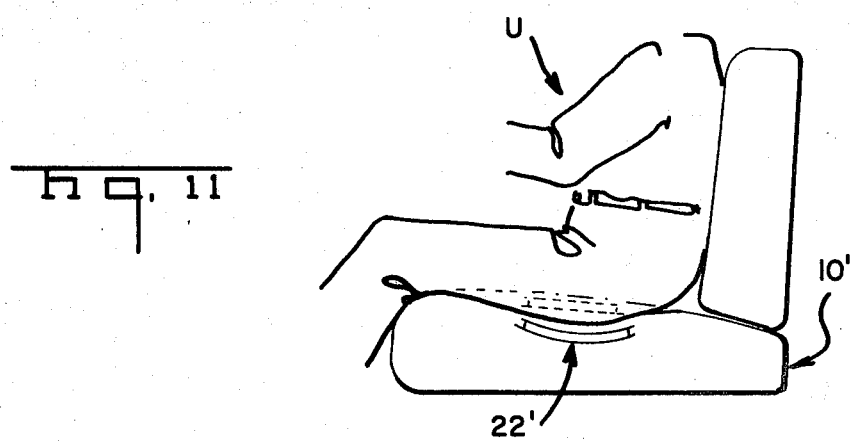
FIG. 11 is a diagrammatic view of a seat incorporating the switch of FIGS. 9 and 10, during occupancy, the dotted line position indicating the position of the switch components when the seat position is unoccupied.

The embodiment of FIGS. 1–8c is employed, in general, in a foam vehicle seat construction in which the resiliency of the seat is provided essentially by a single relatively thick pad of foam material which covers the top of the seat exclusive of the seat back. However, the present invention has application to seat constructions in which a combination of a foam pad and springs are employed to provide resilient support for the occupants. Reference to FIGS. 9, 10 and 11 illustrates an alternate embodiment of the seat sensor switch which is essentially characterized by a lack of an outer foam sheet and wherein deflection of the primary lance at each location occurs, not as a result of localized deformation to the foam overlying the upper metal conductor strip, but as a result of the curvature given to the planar low profile switches as a result of occupancy of the seat. The illustrated switch assembly is quite similar and, in many respects identical, to that of the prior illustrated embodiment, and like elements are given like primed numerical designations. In that respect, seat sensor switch or assembly 22' comprises upper and lower mylar film sheets 24' and 26' of rectangular configuration and acting to sandwich the remaining components of the switch assembly with electrical leads 30' entering from one end of the assembly, the mylar sheets 24' and 26' being also provided with apertures 32' to permit fixing of the assembly in the proper position within the seat construction 10' illustrated schematically in FIG. 11. The upper foam sheet is omitted in this switch assembly and lying beneath the upper mylar film sheet 24' is in this case a pair of laterally spaced, longitudinally extending active metal conductor strips 36' each of which carries at one or more locations, primary lances 44' which are struck out from the same, being defined by U-shaped opening 46', the primary lances being cantilever supported and integral with the active conductor sheets 36'. Lying beneath the active conductor strips 36', is an interposed open foam, plastic insulative sheet 40' which, in similar fashion to the prior embodiment, is provided with a rectangular opening 42' for each conductor strip 36', being of a width less than the width of the conductor strips 36', but in excess of the width of the U-shaped openings 46' within the active conductor strips 36'. The bottom mylar film strip 26' underlies the passive metal conductor strip 38' at each active conductor strip location, the active and passive conductor strips being generally of similar configuration, with the exception of course that each passive conductor strip 38' is solid. The active conductor strips 36' may be bonded to the bottom surface of the upper mylar strip 24' and the passive conductor strips 38' may be bonded at similar locations to the lower mylar film strip 26' with the foam strip 40' interposed between the same to normally prevent contact between the conductive strips. Electrical connections are made between lead wires 30' and the respective conductor strips through appropriate terminals 32' and 48', respectively. Terminal 32' further electrically connects the upper active conductor strips 36', while terminal 48' performs the same function with respect to the underlying but electrically insulated passive conductor strips 38'.

In similar fashion to the prior embodiment, the primary lances are provided with paired secondary lances 52' and 54', the secondary lance 54' being inboard of lance 52', the secondary lances operating in generally the same fashion as their counterparts in the earlier described embodiment.

If a foam pad is provided in the seat construction 10' to which the switch assembly 22' has application, the foam pad is relatively thin. In fact, occupancy of the seat at a location of one of the switch assemblies 22' causes, in general, a fore to aft curvature, that is, bending into a concave configuration generally facing the back side of the occupant.

The movement of the planar switch assembly from a flat, straight or in line position, to a position of curvature effects switch closure. Since each primary lance 44' is cantilever mounted, and since there is an absence of foam tending to deflect the lance relative to the opening 46' defining the same within the active conductor strip 36' upon convex curvature to the complete switch assembly 22', each lance tends to move to a position of tangency with respect to the conductive strip 36' from which it is partially struck out. If sufficient curvature is given to the sandwich, the foremost secondary lance 52' makes contact with the underlying but spaced passive conductor strip 38', thus completing the circuit between leads 30'. In this embodiment it is therefore a curvature mode which causes circuit completion. In like manner to the prior embodiment, any bounce experienced by the primary lance which would permit momentary opening between the forward or outboard secondary lance 52' and the underlying conductor strip 38' is prevented by subsequent contact between the trailing or inboard secondary lance 52'. In the embodiment of FIGS. 9–11 during circuit completion, a slight extension and retraction of the primary lances 44' relative to the relatively fixed underlying passive conductor strip 38' occurs, the extension and retraction of the lance performing a wiping action in the area of contact between the lances and strips 38', thus insuring a clean contact area and circuit completion with minimum resistance. In both embodiments, the leading or outboard secondary lance 52' rides along the surface of the passive conductor strip, scrubs it and then reverses to seek a median position within the scrubbed area to insure excellent electrical contact between the switch elements regardless of numerous switching operations during vehicle use.

From the above description, it is apparent that open cell foam strips as at 34 and 40 in the first embodiment and 40' in the second embodiment act to electrically insulate the conductive strips from each other, and further provides the resilient means to force the primary lances to deflect to switch completion. 194 Olin (a trademark of the Olin Matheson Corporation) brass alloy forms the conductive strips from which the lances are partially struck out, the switch materials having good electrical conductivity, being generally non-corrosive and providing suitable resilience to the lances. It should be noted that in the first embodiment, the lances aid in moving the localized portion of the foam out of the area of protrusion as defined by the opening forming the individual primary lances. In the second embodiment, the whole assembly reverts to a flat planar position from the full line curved position, FIG. 11, once the occupant rises from the seat 10'.

The principles of the invention can be used for warning systems of either the front seat or the rear seat of a conventional sedan, assuming that the front seat is capable of accomodating three passengers.

The foam strips 34, 40 are disclosed as being of the same material as the upholstery foam in the interest of simplicity and convenience. These strips can alternatively be of any suitable insulating material capable of undergoing resilient deformation since they function primarily as insulating spacers. For example, they could be of molded plastic such as polyethylene.

A distinct advantage of the provision of two secondary lances 52, 54 on the primary lance 44 is that regardless of the loading and the amount of flexure of the primary lance, electrical contact between the primary lance and the passive strip will always be point contact between one or both of the secondary lances and the passive strip. This result is achieved regardless of the extent to which the primary lance 44 is flexed and flatened against the passive strip by the load applied. In the absence of the second secondary lance, it is possible to flaten the primary lance against the passive strip under extremely heavy loading so that contact is established in a flatened contact area of the primary lance. If this type of contact is established, the unit pressure in the contact area will drop so that a high resistance will develop which can result in heating and deterioration of the switch.

It is understood that the term Mylar refers to polyethylene-terephthlate.

Other embodiments and modifications of the present invention will become apparent from the spirit and scope of the appended claims.

While the invention has been particularly shown and described with reference to the preferred embodiments thereof, it will be understood by those skilled in the art that changes in form and details may be made therein without departing from the spirit and scope of the invention.

What is claimed is:

1. A planar, low profile switch assembly operable by localized deformation by a human body sitting upon the same, said assembly comprising:
   an upper flexible, resilient electrically conductive metal strip,
   a similar, lower, flexible, resilient, electrically conductive metal strip,
   a foam member interposed between said strips tending to maintain said strips in spaced, non-contact position in the absence of said human body,
   at lease one primary lance partially struck from said upper strip and normally lying in the same plane as the upper strip proper, but being relatively displaceable toward the other strip during forceable depressible distortion of said assembly,
   said foam member including an opening surrounding said primary lance to permit deflection of said lance within said foam member opening towards the strip and into contact therewith,
   and said primary lance including at least one other short, secondary lance formed within the same and projecting downwardly therefrom in the same direction as said primary lance deflection for initial contact with said lower metal strip.

2. The switch assembly as claimed in claim 1, wherein said secondary lances are two in number and are longitudinally spaced from each other and adjacent the free end of the primary lance, whereby, at least one of said secondary lances moves longitudinally during contact with said lower metal strip to effect a wiping action of the area of contact, and one of said secondary lances maintains contact with said lower metal strip during intermittent movement of said other contact away from said strip to prevent arcing between said metal strips at the contact interface.

3. The switch assembly as claimed in claim 1, wherein a second solid foam member overlies said upper metal strip, whereby compression of said switch assembly by said human body causes a localized portion of said second foam member, corresponding to the opening in the upper strip defined by the primary lance, to enter said opening and to depress the primary lance into contact with the lower metal strip and upon body removal, the resiliency of said primary lance forces the localized portion of the second foam member back through the opening and returns the primary lance to a coplanar position with respect to said upper metal strip.

4. The switch assembly as claimed in claim 2, wherein a second solid foam member overlies said metal strip, whereby compression by said body of said switch assembly causes a localized portion of said second foam member corresponding to the opening in the upper strip defined by the primary lance to enter said opening and depress the primary lance into contact with the lower metal strip and upon body removal, the resiliency of said primary lance forces the localized portion of the second foam member back through the opening and returns the primary lance to a coplanar position with respect to said upper metal strip.

5. In combination, a seat construction including a pad of foam material spanning the top of said seat, recesses within said foam pad at each possible occupant position, a planar low profile switch assembly carried within each recess and operatively responsive to localized occupancy of said seat, each switch assembly comprising:
   an upper flexible, resilient, electrically conductive metal strip,
   a lower electrically conductive metal strip,
   a first foam strip interposed between said strips and tending to maintain said strips in spaced non-electrical contact position,
   at least one primary lance partially struck from said upper strip and normally lying in the same plane as the upper strip proper, but being relatively displaceable during seat occupancy at a given position towards said lower strip, and
   an opening formed within said first foam strip surrounding the opening defined by said primary lance and permitting deflection of said primary lance within said first foam strip opening into contact with said lower strip, and
   a second unbroken foam strip overlying said upper metal strip,
   whereby, occupancy of said seat at any one of said occupant positions causes a localized portion of said second foam strip corresponding to the opening in the upper metal strip to depress said primary lance into contact with said lower metal strip.

6. The foam seat assembly as claimed in claim 5, wherein said primary lance includes at least one short, secondary lance within said primary lance and projecting downwardly therefrom in the same direction as said primary lance deflection to effect initial contact with said lower metal strip.

7. The foam seat assembly as claimed in claim 6, wherein said secondary lances are two in number and longitudinally spaced from each other and positioned adjacent the free end of the primary lance and wherein said primary lance is struck out from said upper electrically conductive metal strip in a direction such that at least one of said secondary lances makes wiping contact with said lower electrically conductive metal strip during extending and retracing of said primary lance during occupancy so as to insure a clean electrical contact between said metal strips.

* * * * *